United States Patent
Benson

(10) Patent No.: US 7,372,429 B1
(45) Date of Patent: May 13, 2008

(54) INFORMATION MODULE ASSEMBLY AND METHOD OF CONTROLLING ACCESS TO DIFFERENT LEVELS OF INFORMATION

(75) Inventor: Charles M. Benson, Colorado Springs, CO (US)

(73) Assignee: ATR Mission Concepts, Colorado Springs, CO (US)

( * ) Notice: Subject to any disclaimer, the term of this patent is extended or adjusted under 35 U.S.C. 154(b) by 625 days.

(21) Appl. No.: 11/065,449

(22) Filed: Feb. 25, 2005

Related U.S. Application Data

(60) Provisional application No. 60/547,796, filed on Feb. 27, 2004.

(51) Int. Cl.
*G09G 5/00* (2006.01)
(52) U.S. Cl. .......................................................... 345/8
(58) Field of Classification Search ................... 345/8, 345/7; 349/11; 359/13, 630; 340/461; 455/566
See application file for complete search history.

(56) References Cited

U.S. PATENT DOCUMENTS 5,867,795 A * 2/1999 Novis et al. ................ 455/566

* cited by examiner

*Primary Examiner*—Abbas I Abdulselam
(74) *Attorney, Agent, or Firm*—Foley & Lardner LLP

(57) ABSTRACT

An information module and an information distribution system and method are disclosed, which permit information to be shared among individuals in a particular environment while avoiding visual access to other individuals displays. The information distribution system includes a main display unit having a first display region and a second display region; and a plurality of information modules, each of the information modules comprising: an operator region configured for receiving an operator in an operator position; a heads-up display region arranged relative to the operator position, configured for displaying textual information; and a virtual display region comprising at least one virtual display, the at least one virtual display configured for displaying information according to at least an information criteria, the virtual display region arranged adjacent the heads-up display region. The information modules are arranged such that an operator in the operator position does not have a line of sight to the first display region.

18 Claims, 10 Drawing Sheets

100

INFORMATION MODULE ASSEMBLY AND METHOD OF CONTROLLING ACCESS TO DIFFERENT LEVELS OF INFORMATION

CROSS-REFERENCE TO RELATED PATENT APPLICATIONS

This application is an application claiming the benefit under 35 U.S.C. 119(e) of U.S. Provisional Application No. 60/547,796, filed Feb. 27, 2004, incorporated herein by reference in its entirety.

FIELD OF THE INVENTION

The invention relates to an information module assembly, an information module, an information distribution system and method of controlling access to different levels of information among different individuals.

BACKGROUND OF THE INVENTION

Information distribution systems for a team working on a common mission are known. For example, mission rooms for command and control missions are known. In many situations, however, these information distribution systems do not readily discriminate and differentiate information to be provided to different locations of the room according to the particular information needs and/or security level of the individuals in team.

In a typical environment, many individuals are seated in a common area, and have common or overlapping visual lines of sight to individual or common information displays (such as CRTs, LCDs, LEDs, plasma displays, or other displays as are used to provide visually to a user). For example, air traffic or mission controllers may be seated in a room, with individual controllers having a designated information display. One or more common displays may be positioned above the individuals within the line of sight to several individuals. With such arrangement, many or all individuals in the environment may have access to the information displayed on the individual or common displays. Consequently, access to the environment must be limited to a particular control group if information is intended to be restricted.

Further, it often occurs that individuals accessing controlled information may have different levels of access. In a conventional environment, the level of information displayed in the environment cannot exceed that of the lowest level among those of the group having access to the environment. If individuals with a higher level wish to access a higher level of information than permitted to be seen by others in the environment, they often must move to separate environment, such as a smaller room, that provides the more limited level of information.

There are many environments in which controlled access to information is desirable. In addition to defense and air control environments, they may include, for example, hospitals and clinics, where patient registration may retrieve confidential information of patients. It would be desirable in such environments to ensure that such confidential information may not be readily seen by other patients, and is restricted to medical staff having a need to access such information.

SUMMARY OF THE INVENTION

According to one embodiment of the invention there is provided an information module. The information module comprises: an operator region configured for receiving an operator in an operator position; a heads-up display region arranged relative to the operator position, configured for displaying textual information; and a virtual display region comprising at least one virtual display, the at least one virtual display configured for displaying information according to at least an information criteria, the virtual display region arranged adjacent the heads-up display region.

According to another embodiment of the invention there is provided an information distribution system. The information distribution system comprises: a main display unit having a first display region and a second display region; and a plurality of information modules, each of the information modules comprising: an operator region configured for receiving an operator in an operator position; a heads-up display region arranged relative to the operator position, configured for displaying textual information; and a virtual display region comprising at least one virtual display, the at least one virtual display configured for displaying information according to at least an information criteria, the virtual display region arranged adjacent the heads-up display region; and wherein the information modules are arranged such that an operator in the operator position does not have a line of sight to the first display region.

According to another embodiment of the invention, a method of controlling access to information among several individuals in an environment includes providing a plurality of information modules. Each information module comprises: an operator region configured for receiving an operator in an operator position; a heads-up display region arranged relative to the operator position, and configured for displaying textual information; and a virtual display region comprising at least one virtual display. The at least one virtual display is configured for displaying information according to at least an information criteria, the virtual display region arranged adjacent the heads-up display region.

According to one feature, at least one region of each module is shielded to interrupt lines of sight from outside the module. This provides a region in which information restricted to the individual within the module cannot be seen by other individuals within the environment.

Other aspect, features and advantages of the invention are apparent from the following description of preferred embodiments of the invention.

DETAILED DESCRIPTION OF THE INVENTION

Features of the invention will become apparent from the drawings and following detailed discussion, which by way of example without limitation describe preferred embodiments of the invention.

Figure 1:
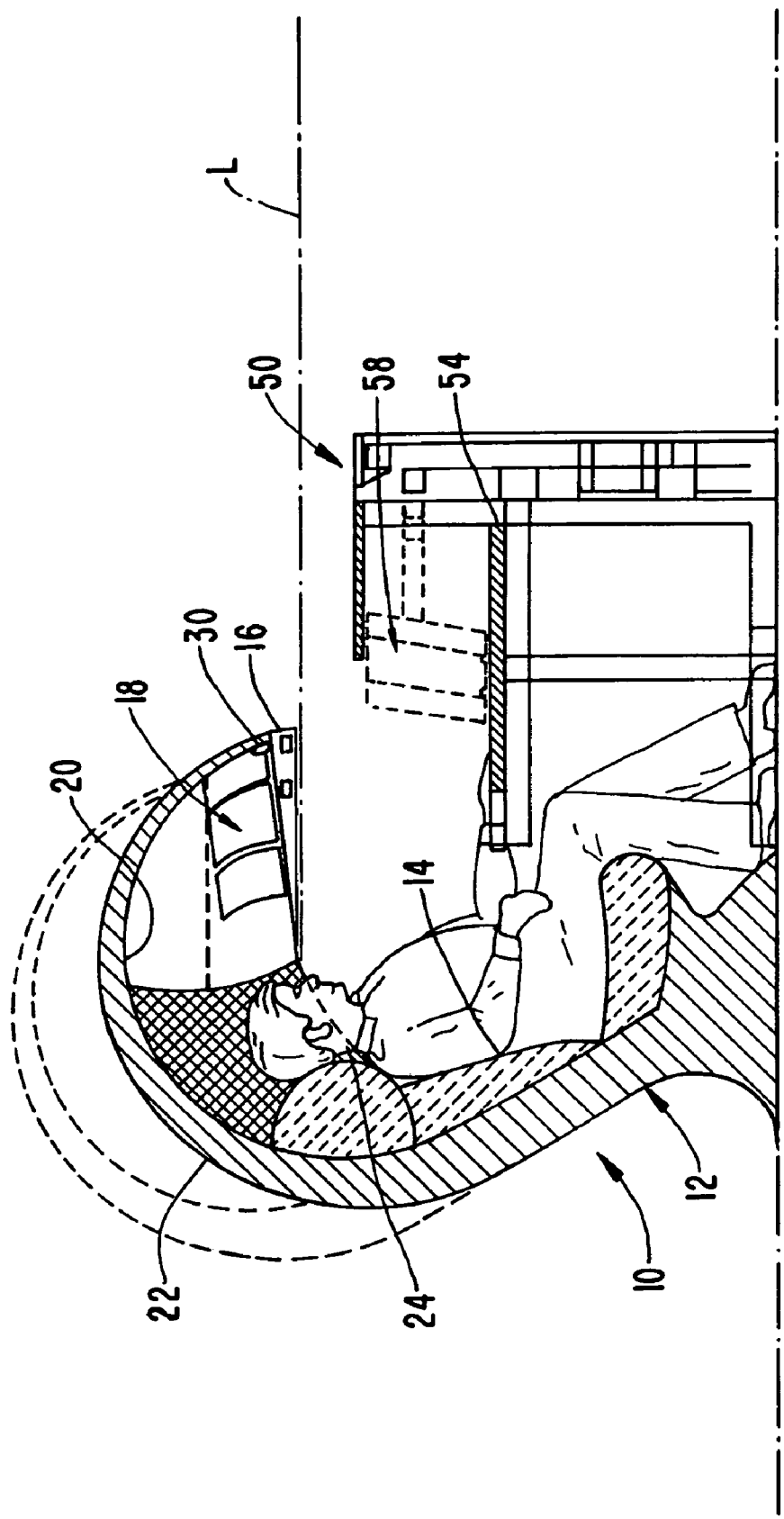
FIG. 1 is a side view of an information module assembly according to an embodiment of the invention.
Figure 2:
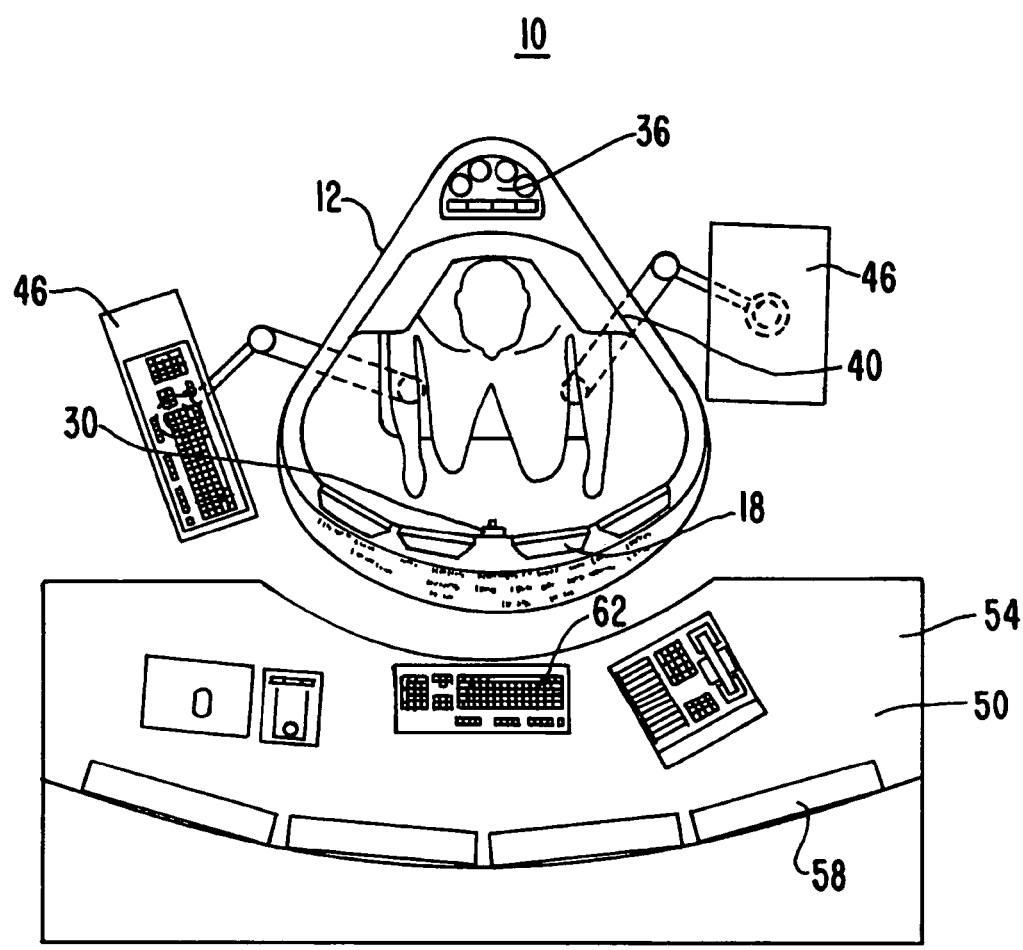
FIG. 2 is top cross sectional view of an information module assembly according to an embodiment of the invention.
Figure 3:
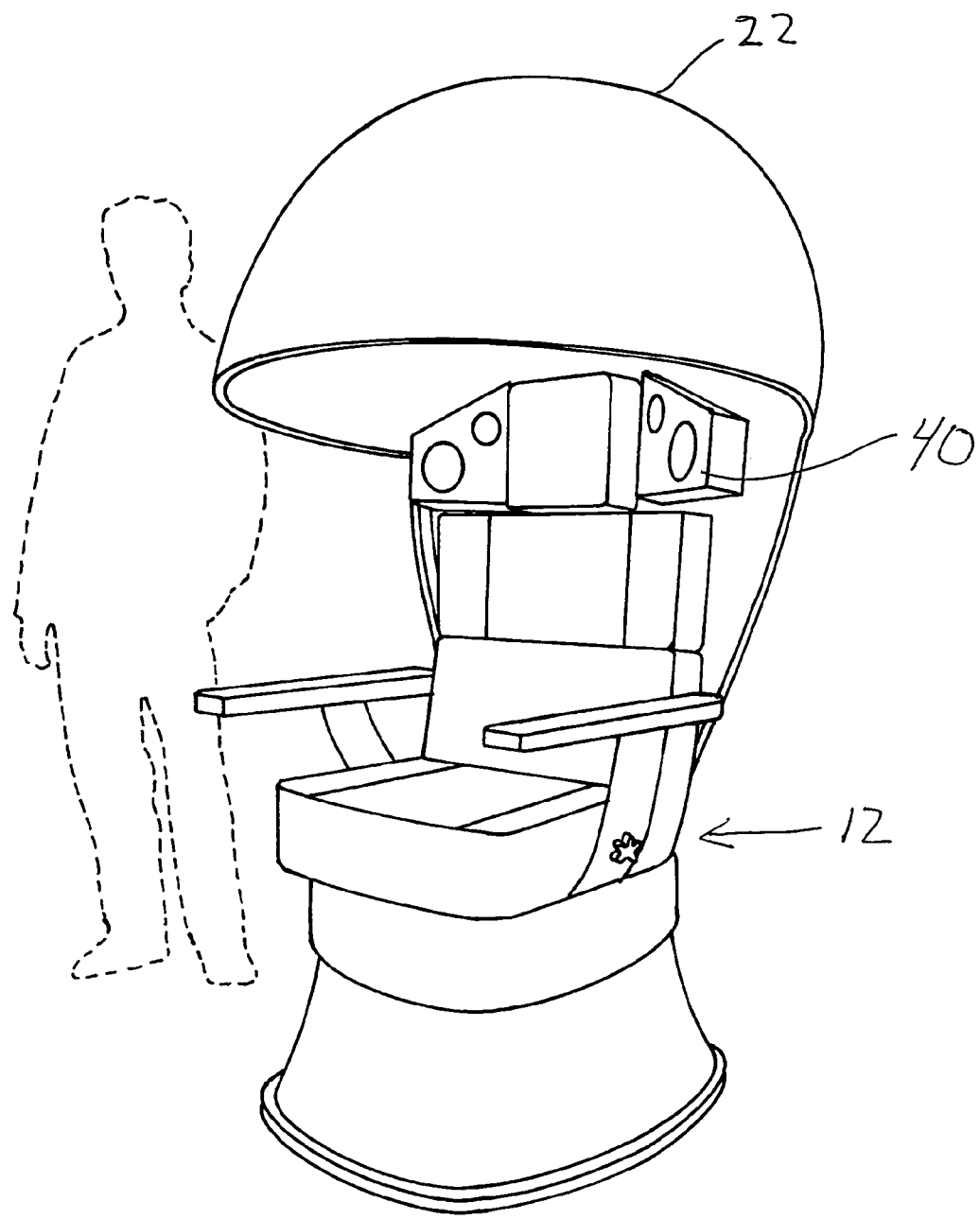
FIG. 3 is a three-dimensional view of an information module according to an embodiment of the invention.
Figure 4:
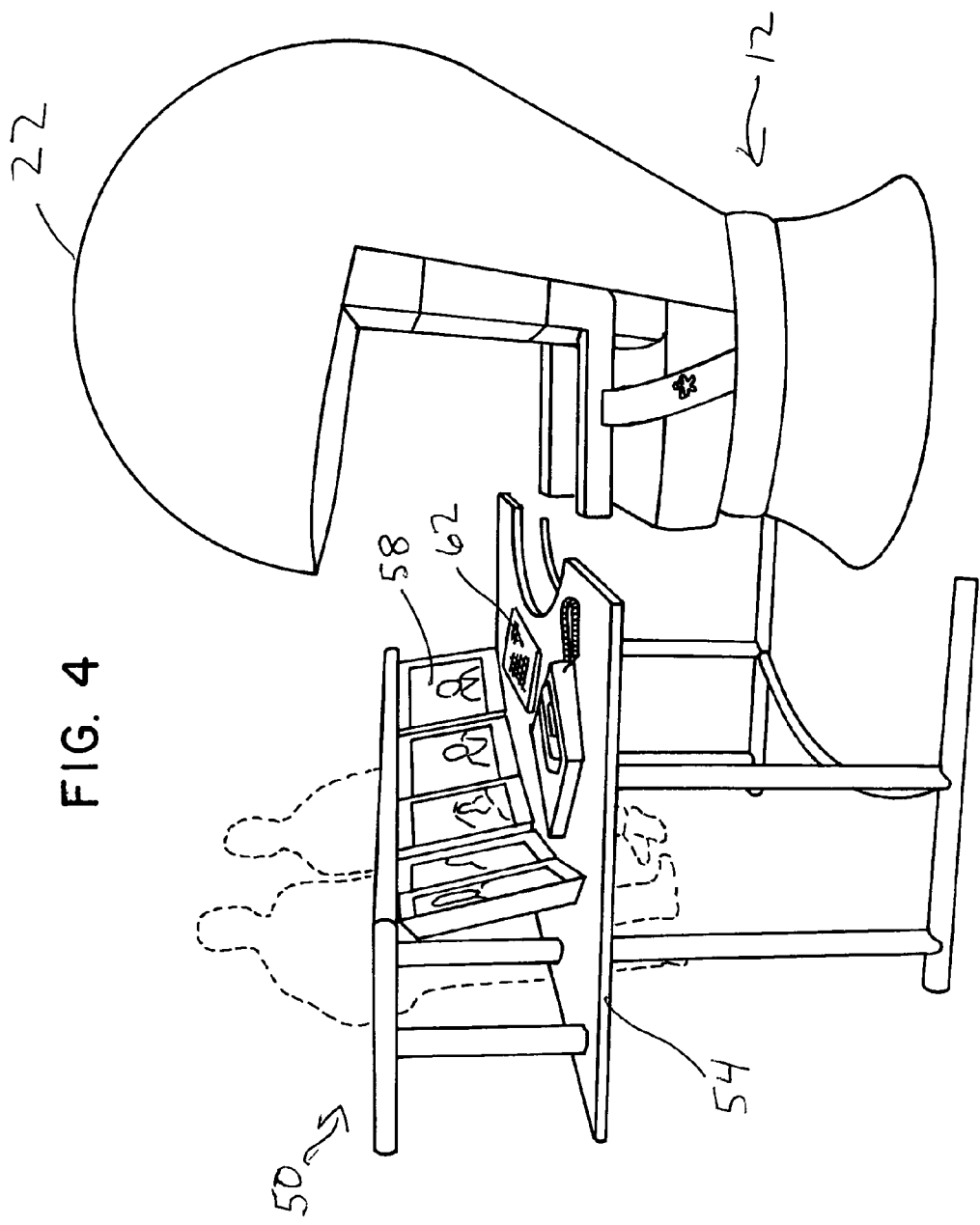
FIG. 4 is a three-dimensional view of an information module assembly according to an embodiment of the invention.
Figure 5:
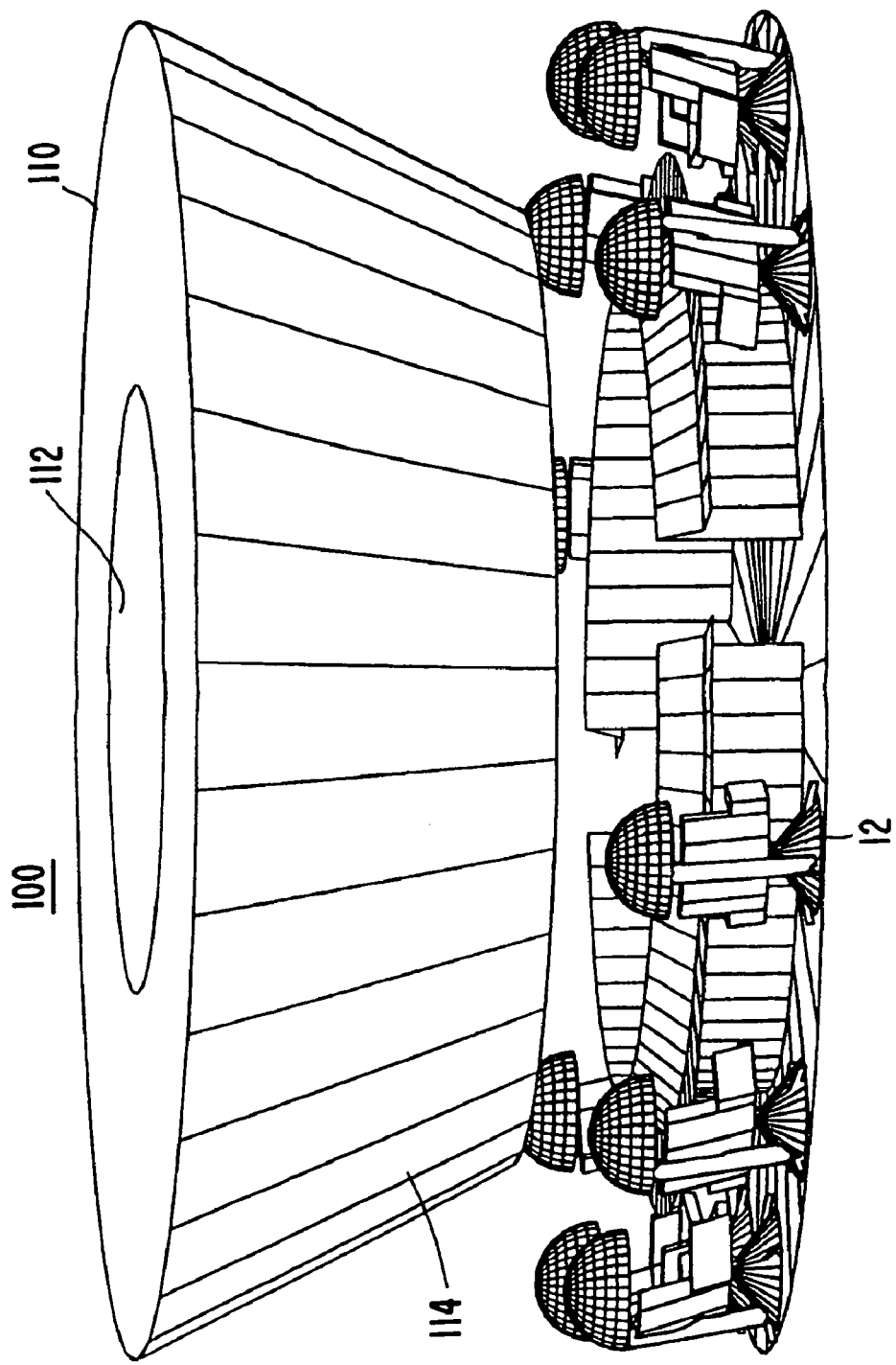
FIG. 5 is a perspective view of a central portion of an information distribution system according to an embodiment of the invention.
Figure 6:
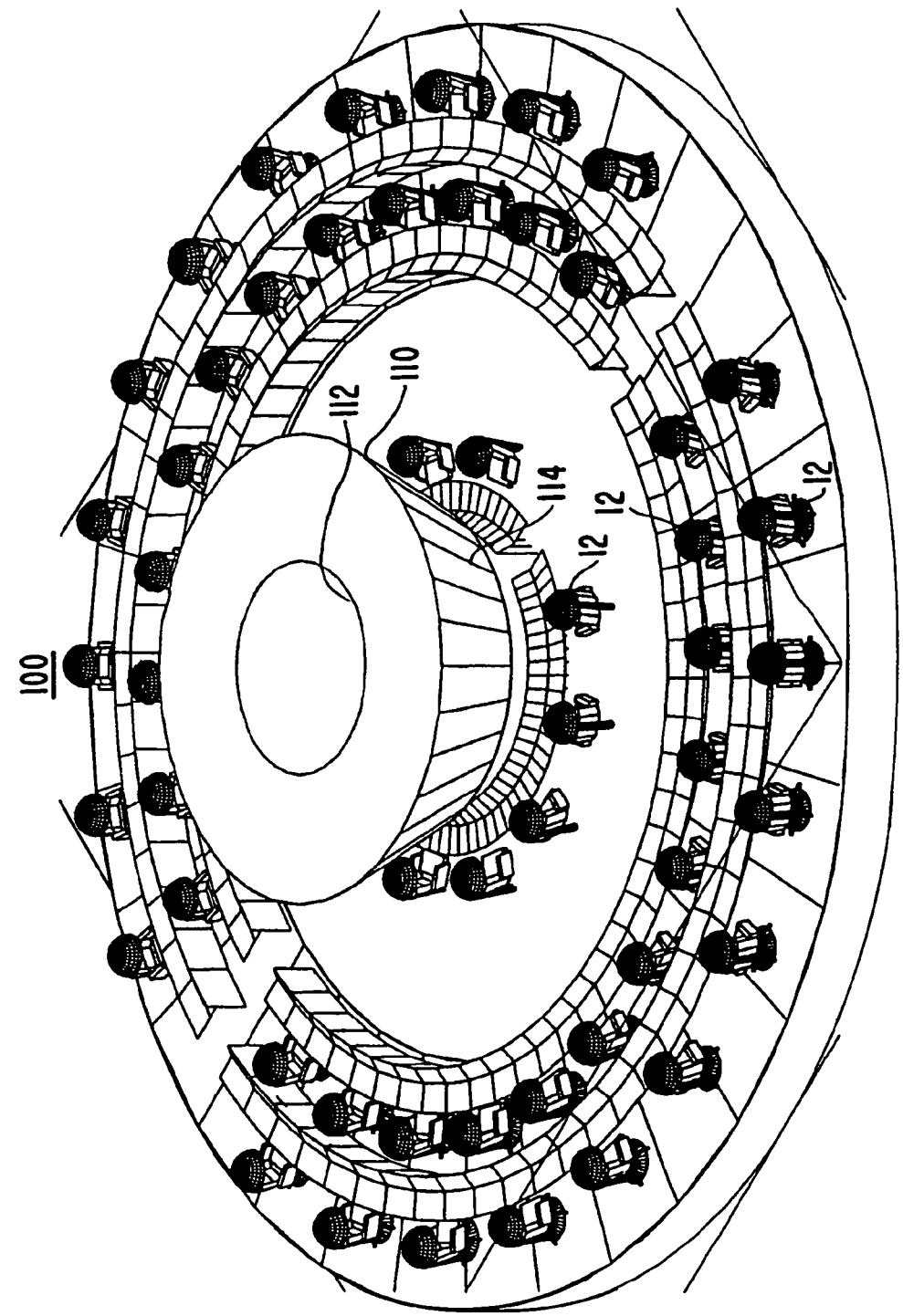
FIG. 6 is a top perspective view of an information distribution system according to an embodiment of the invention.
Figure 7:
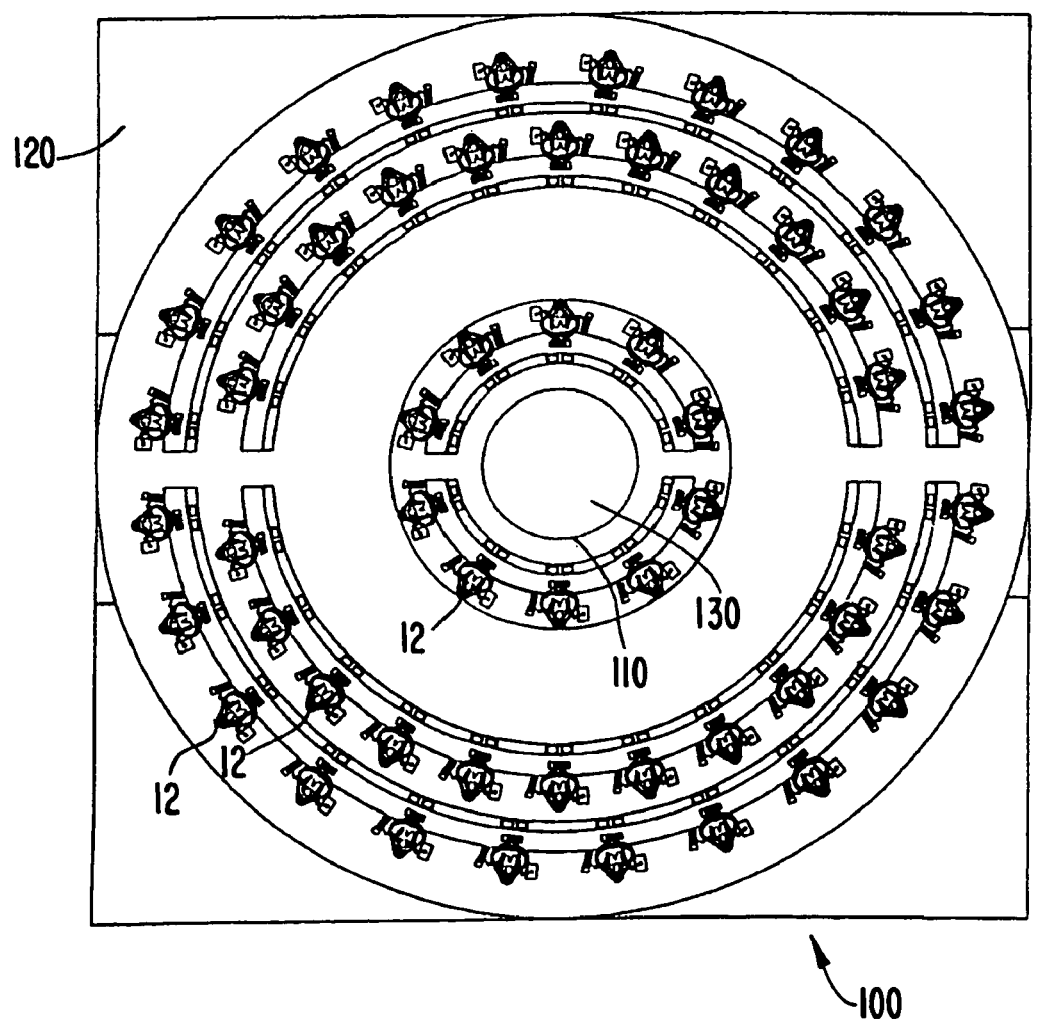
FIG. 7 is a top view of an information distribution system according to an embodiment of the invention.
Figure 8:
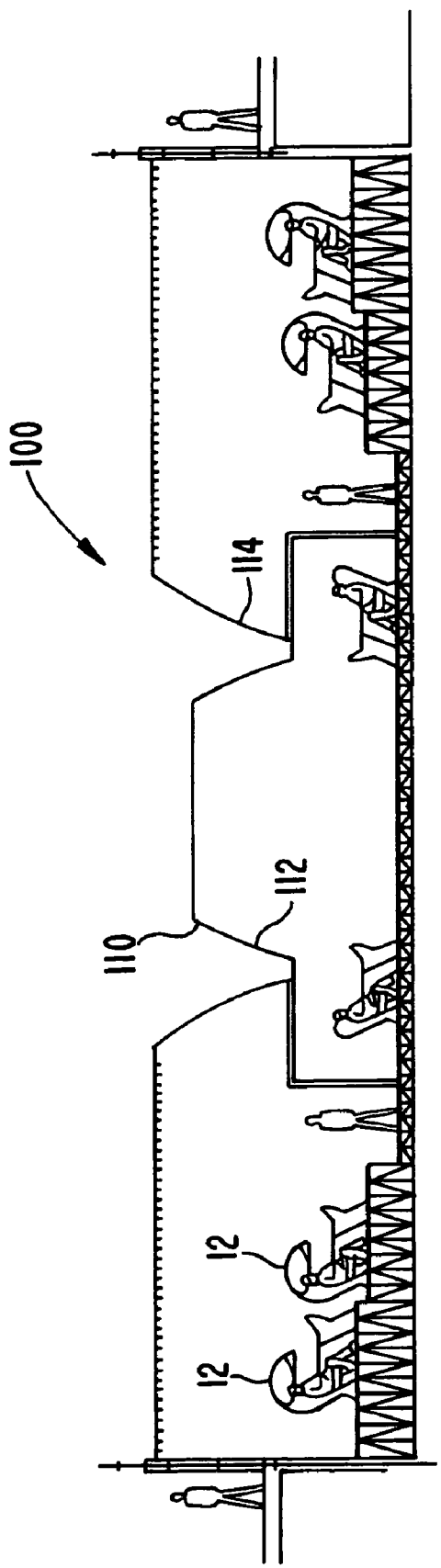
FIG. 8 is a side cross sectional view of an information distribution system according to an embodiment of the invention.
Figure 9:
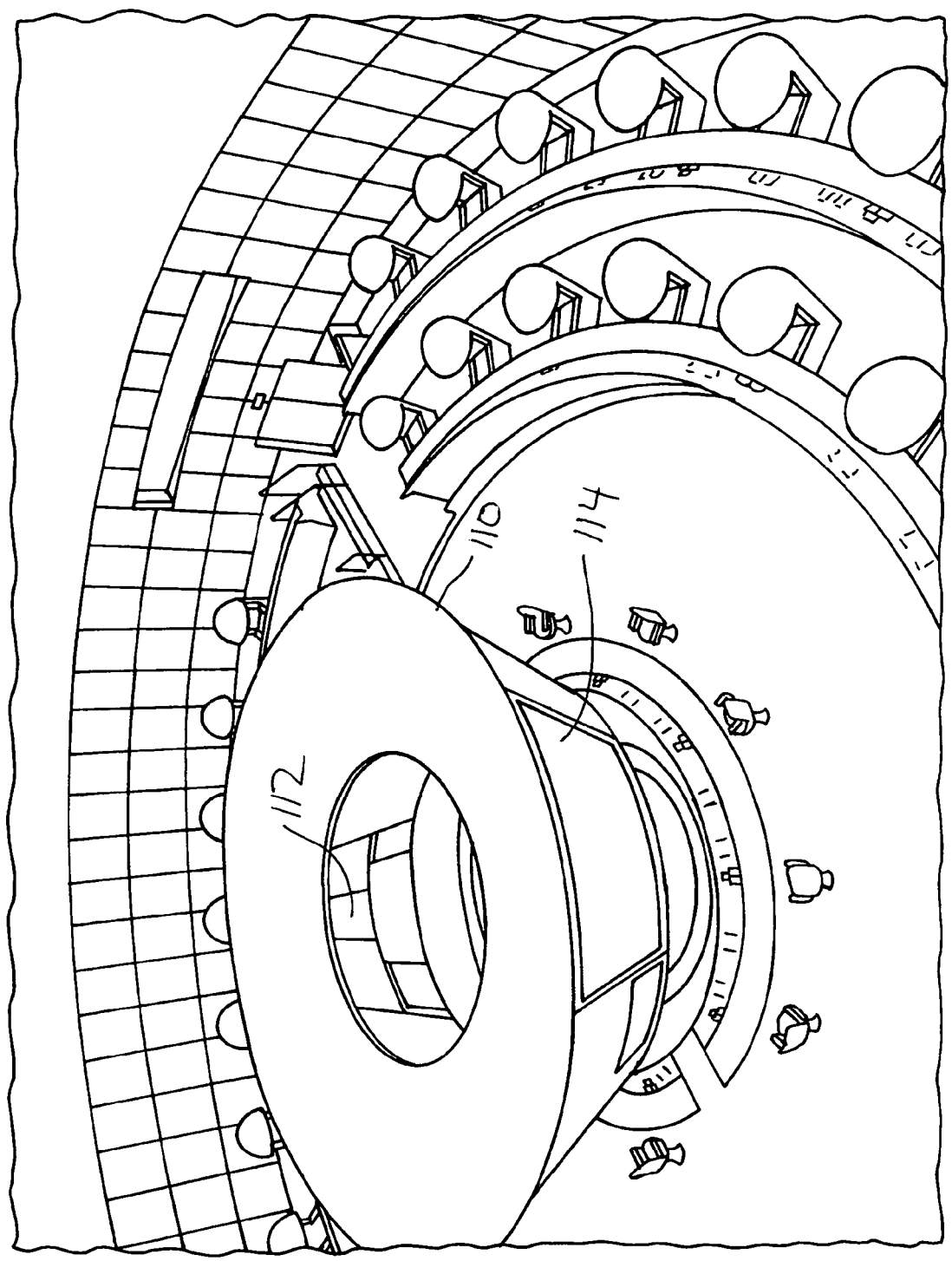
FIG. 9 is a top perspective view of an information distribution system according to an embodiment of the invention.
Figure 10:
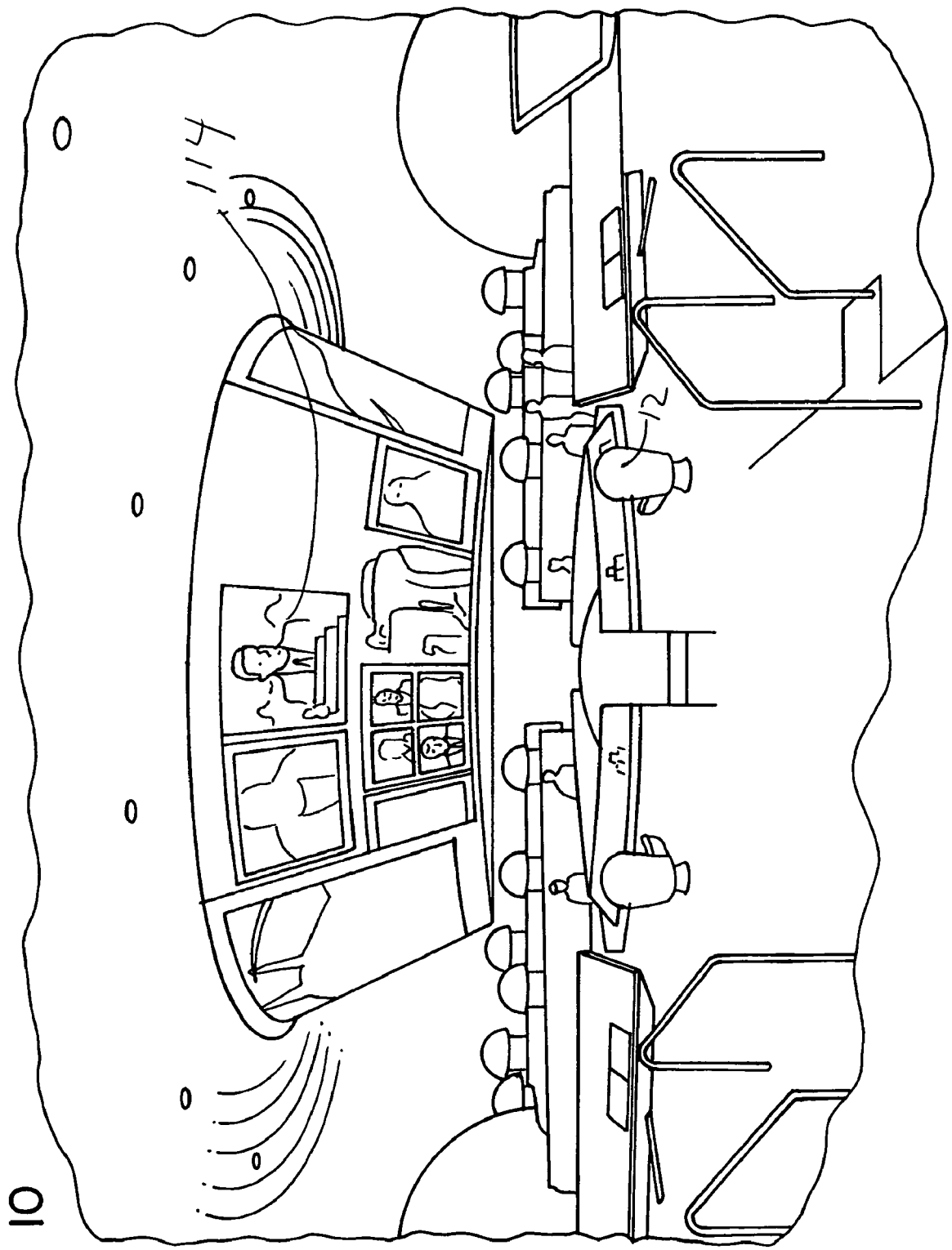
FIG. 10 is a side perspective view of an information distribution system according to an embodiment of the invention.

FIGS. 1-4 illustrate an information module assembly 10 including an information module 12 according to an embodiment of the invention. The information module 12 includes an operator region 14 configured for receiving an operator in an operator position. FIGS. 1 and 2 illustrate an operator in the operator position. The operator region 14 of the information module may be a chair, for example, as shown. As illustrated, the chair is partially enclosed within the module so as to block lines of sight to information displayed within the module, while allowing the operator to converse, see, and interact with others outside the module.

The information module 12 has a heads-up display (HUD) 16 arranged relative to the operator position configured for displaying textual information. As illustrated, the HUD 16 may be positioned just above the operator's horizon.

The information module 12 has a virtual display region 18 comprising at least one virtual display. The virtual displays display information according to at least an information criteria, and are arranged adjacent the HUD 16. The virtual displays are preferably flat panel displays, such as plasma screens, or LCD screens. Other screens known in art may also be used that display graphical and/or textual information.

The information module 12 includes a ceiling 20 arranged above the operator position. As illustrated, the ceiling 20 is defined by the interior of a hood 22 that is configured to partially enclose the operator and block visual lines of sight to the HUD 16 and HUD 18 from predefined angles. In the example illustrated, in an operative position, the hood 22 extends down to a position just above the forward line of sight of the operator L as shown in FIG. 1. It is further configured to extend downward along the side position of the operator's head 22. The HUD 16 and the virtual display region 18 are arranged on a forward portion of the ceiling 20 within the hood 22 so that an operator in the operator position may readily view the HUD 16 and the virtual display region 18, while the hood enclosure 22 (in an operative position) blocks lines of sight to the HUD 16 and virtual display region 18 from outside the module.

As illustrated, the information module 12 may also include an elevating mechanism configured for elevating and lowering the ceiling 20. The dashed lines in FIG. 1 illustrate the elevated position. An operator may enter the information module when the ceiling 20 is in the elevated position and the ceiling 20 may then be lowered.

The information module 12 in this example includes a camera 30 arranged relative to the operator position so as to receive visual information of the operator position. The camera 30 helps facilitate communication of the operator with one or more other operators or a command center, for example. The camera 30 can also be used for teleconferencing, for example.

The information module 12 of the illustrated embodiment includes a communication/power spine 36 arranged adjacent the operator position that provides communication data and power to the information module 12. The communication/power spine 36 may receive communication data and power from a floor upon which the information module 12 rests, and disperses the power and communication data as needed to the regions of the information module 12.

The information module 12 of this example includes an audio unit 40 arranged adjacent the operator position configured to provide audio information to an operator in the operator position 14. The audio unit may comprise an operator headset, for example, or other configuration of speakers. The audio unit 40 may comprise a directional transmitter, for example, or some other mechanism that allows the audio information supplied to the operator to be selected according an information criteria. In this way the audio information supplied to the operator may be switched according to the criteria.

As illustrated in this example, the information module 12 includes one or more articulating tables 46 arranged adjacent the operator position. The articulating tables 46 may be interchangeable (for left or right handed people) and located on either side of the information module. The articulating tables 46 may be used as a writing surface, a keyboard and/or mouse support, for example. The tables 46 may have three pivot points, for example.

In this example, the information module assembly 12 includes a work station 50, for example, arranged in front of the information module 10. The work station 50 may include a desk 54, one or more traditional work station displays 58, and a keyboard 62 arranged on the desk 54, for example. The work station 50 allows the operator to receive standard information, as in conventional environments for accessing data.

The information module 12 allows the information supplied to an operator in the operator position to be supplied with information according to an information criteria. For example the information criteria may include a security criteria, such as a security clearance level of the operator, for example. The information criteria may additionally or alternately include an information type criteria. The information type criteria may be tailored to the specific function of the operator using the information module 12. For example, if the operator is to deal only with information relative to a group of products or a component of a mission, the information type criteria would be information relevant to the group of products or the component of the mission.

Information is provided according to techniques known in the art. Preferably, the identity or security clearance of the operator is verified, and information is provided based on the level of clearance. Conventional techniques for verification and electronic communication and display of the data may be utilized as known in the art.

FIGS. 5-10 illustrate an information distribution system 100 according to an embodiment of the invention, where the information distribution system 100 includes information modules 12, such as those described with respect to FIGS. 1-4 above. The information distribution system 100 includes a main display unit 110 having a first display region 112 and a second display region 114. The main display unit in this example comprises a truncated conoidal area, for example, where the first display region 112 is arranged on an inner surface of the truncated conoidal area, and the second display region 114 is arranged on an outer surface of the truncated conoidal area.

The information modules 12 are arranged such that an operator in the operator position does not have a line of sight to the first display region 112. Thus, only individuals in an inner region may view information from the first display region 112. The information modules 12 are preferably arranged, however, such that an operator in the operator position does have a line of sight to at least a portion of the second display region 114.

The information distribution system 100 may be implemented in a number of different environments, such as a mobile or stationary environment. The information distribution system 100 may comprise a room 120, for example, where the main display unit 110 is arranged in a center region 130 of the room and the plurality of information modules 12 are arranged around the center region 130.

In mobile environments, the modules are preferably configured to use lighter materials. The modules for such environments are also preferably configured to attach rigidly to an airplane or other mobile structure and to be resistant to high torque and strain resulting from rapid acceleration or deceleration.

The above described information module, information module assembly and information distribution system and method provide a number of advantages. For example in a command and control environment, different levels and priorities of security clearance may be implemented into the same space, yet individuals are allowed to be in a line-of-sight and conference room setting with each other. The quality and quantity of realized and distributed information can thus be vastly improved. Because personnel having different security levels need not be separated as before, better and faster decisions are possible.

The arrangement of the main display unit and the information modules allows personnel to be in different regions of a room and see different information from their modules or other positions of the room. If a person is not allowed in a region that allows viewing access to the second display region, that person is not able, simply by use of sight lines, to see information on the second display region.

The arrangement also provides multi-tasking discrimination. An operator in one of the modules without a line of sight to the second display region may still have access to a visual teleconferencing scenario and strongly contribute to the overall mission of the personnel using the information distribution system.

Specifically, it is possible to provide modules configured to verify security levels of the operator through techniques known in the art. Once a level has been established, information is provided and display only to the level permitted. For example, an employee in a hospital registration area may be provided limited access to basic patient data, such as social security number, prior admissions, etc., while a doctor could login and access records of prior treatment. The information is displayed to the operator without being seen by others.

In a command and control application, several modules could be provided in the manner illustrated above, with individuals having higher security clearances being provided access to data that individuals with lower clearances could not see. Higher level-cleared individuals can view such more sensitive information while still being able to converse directly with lower level-cleared personnel.

The information modules are flexible enough to be used in a number of different configurations, either centralized or decentralized. For example the information modules may be used in a centralized Command and Control Node, or in a series of isolated fixed location along with mobile scenarios.

While the invention has been described with reference to certain preferred embodiments, the scope of the invention is not limited to these embodiments. One skilled in the art may find variations of the preferred embodiments, which fall within the spirit and scope of the invention.

What is claimed is:

1. An information module comprising:
   an operator region configured for receiving an operator in an operator position;
   a hood configured to partially cover the operator region, the hood including a first portion that extends down to a position just above a forward line of sight of the operator and a second portion configured to extend downward along the side position of the operator's;
   a heads-up display region configured for displaying textual information, the heads-up display region being arranged within the hood at a position relative to the operator position, whereby lines of sight to the heads-up display region from positions external to the hood are blocked by the hood; and
   a virtual display region comprising at least one virtual display, the at least one virtual display configured for displaying information according to at least an information criteria, the virtual display region arranged adjacent the heads-up display region within the hood, whereby lines of sight to the heads-up display region from positions external to the hood are blocked by the hood.

2. The information module of claim 1, further comprising:
   a camera arranged relative to the operator position so as to receive visual information of the operator position.

3. The information module of claim 1, further comprising:
   a communication/power spine arranged adjacent the operator position and providing communication data and power to the information module.

4. The information module of claim 1, further comprising:
   an audio unit arranged adjacent the operator position configured to provide audio information.

5. The information module of claim 4, wherein the audio unit is configured to provide audio information according to the information criteria.

6. The information module of claim 1, further comprising:
   at least one articulating table arranged adjacent the operator position.

7. The information module of claim 1, wherein the operator region comprises a chair.

8. The information module of claim 1, further comprising:
   wherein the interior of the hood defines a ceiling portion arranged above the operator position, the heads-up display region and the virtual display region being arranged on a forward portion of the ceiling portion.

9. The information module of claim 8, further comprising:
   an elevating mechanism configured for elevating and lowering the hood.

10. The information module of claim 1,
    wherein the information criteria includes a security criteria.

11. The information module of claim 1,
    wherein the information criteria includes an information type criteria.

12. An information module assembly comprising:
the information module of claim 1; and
a work station arranged adjacent to the operator position.

13. The information module assembly of claim 10, wherein the workstation comprises:
a desk;
at least one work station display; and
a keyboard arranged on the desk.

14. An information distribution system comprising:
a main display unit having a first display region and a second display region; and
a plurality of information modules, each of the information modules comprising:
an operator region configured for receiving an operator in an operator position;
a hood configured to partially cover the operator region, the hood including a first portion that extends down to a position just above a forward line of sight of the operator and a second portion configured to extend downward along the side position of the operator's;
a heads-up display region configured for displaying textual information, the heads-up display region being arranged within the hood at a position relative to the operator position, whereby lines of sight to the heads-up display region from positions external to the hood are blocked by the hood; and
a virtual display region comprising at least one virtual display, the at least one virtual display configured for displaying information according to at least an information criteria, the virtual display region arranged adjacent the heads-up display region within the hood, whereby lines of sight to the heads-up display region from positions external to the hood are blocked by the hood.
wherein the information modules are arranged such that an operator in the operator position does not have a line of sight to the first display region.

15. The information distribution system of claim 14, wherein the information modules are arranged such that an operator in the operator position has a line of sight to the at least a portion of the second display region.

16. The information distribution system of claim 14, wherein the main display unit comprises:
a truncated conoidal area, where the first display region is arranged on an inner surface of the truncated conoidal area, and the second display region is arranged on an outer surface of the truncated conoidal area.

17. The information distribution system of claim 14 further comprising a room, and wherein the main display unit is arranged in a center region of the room and the plurality of information modules are arranged around the center region.

18. A method of information to an operator in an information display module while restricting visual access to information displayed within the module comprising:
providing a module according to claim 1;
verifying operator specific information comprising at least the of the identity or level of access to information of the operator of the module;
providing information based on the operator specific information.

* * * * *